Sept. 3, 1946.                B. J. BUTLER                2,406,992
        METHOD AND APPARATUS FOR LOADING AND STORING PINEAPPLES
              Filed Feb. 7, 1944            3 Sheets-Sheet 1
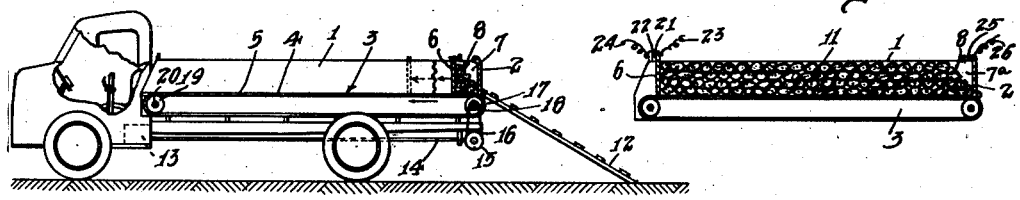
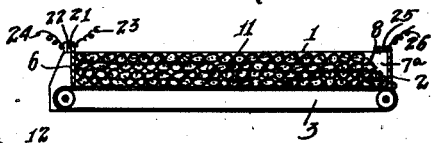
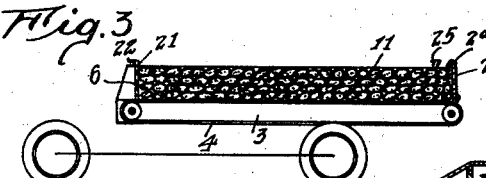
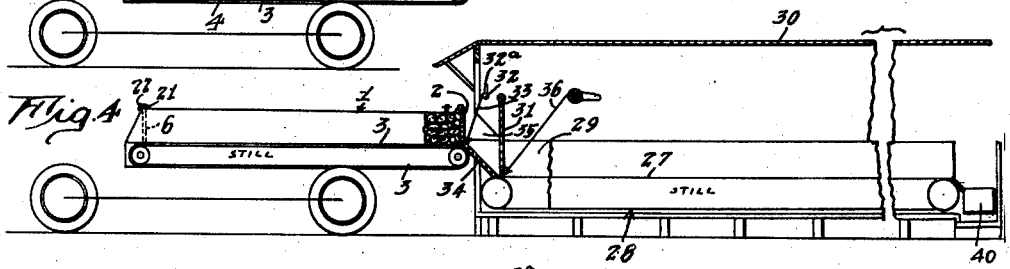
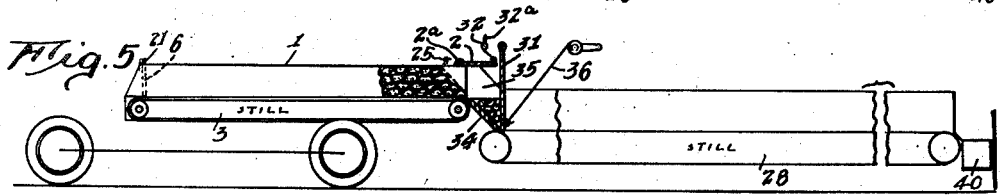
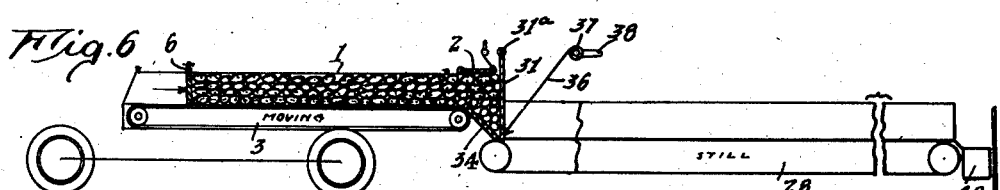
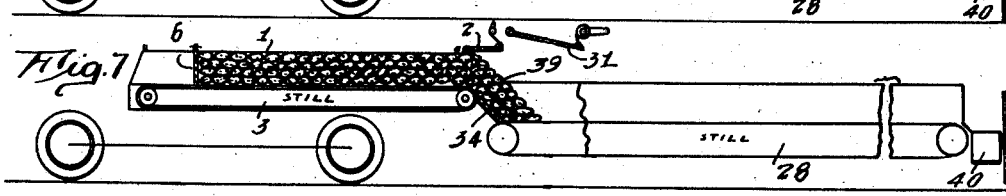
Inventor
Bernard J. Butler
By Lyon & Lyon
Attorneys

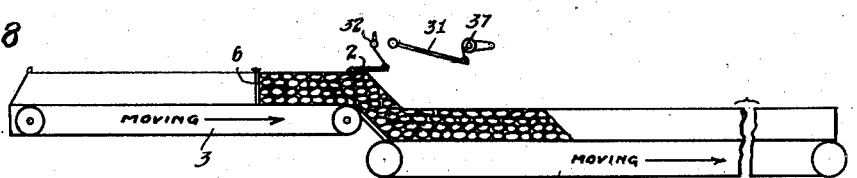
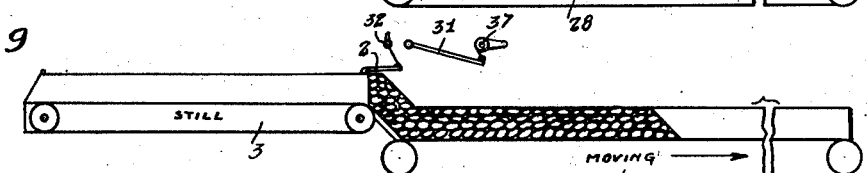
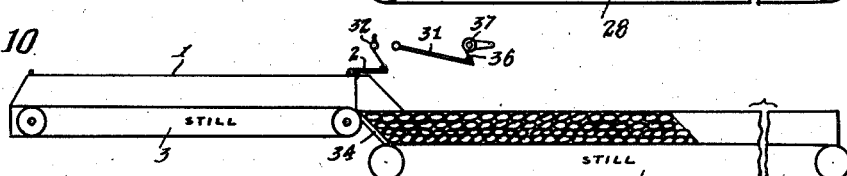
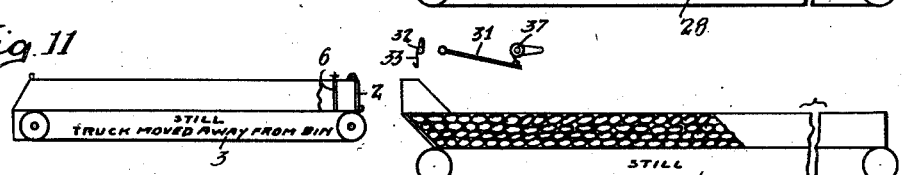
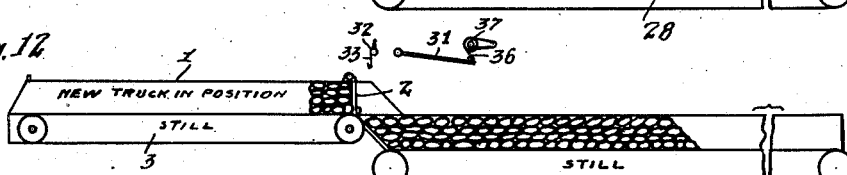
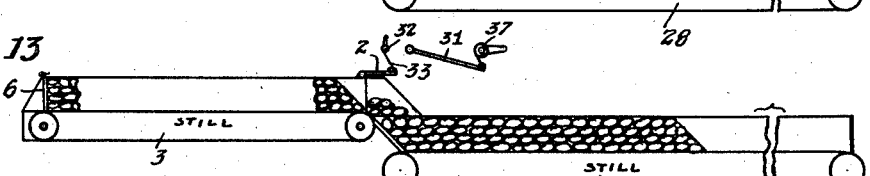
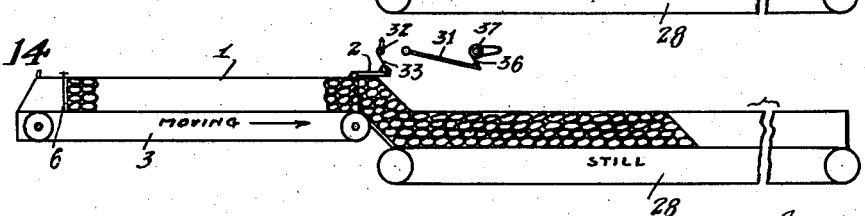

Sept. 3, 1946. B. J. BUTLER 2,406,992
METHOD AND APPARATUS FOR STORING PINEAPPLES
Filed Feb. 7, 1944 3 Sheets-Sheet 3
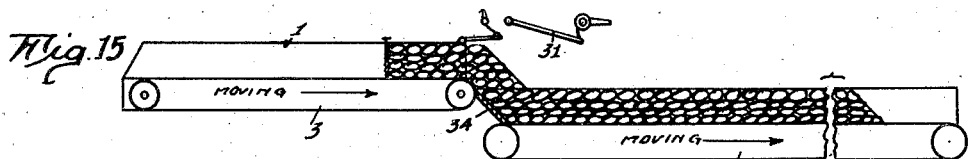
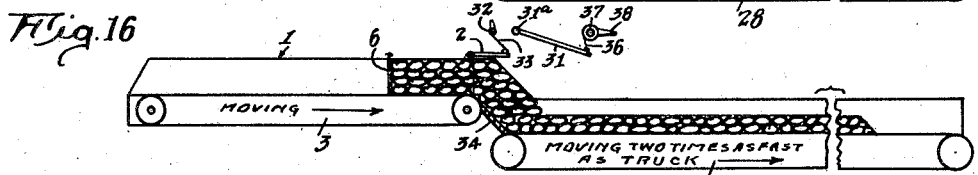
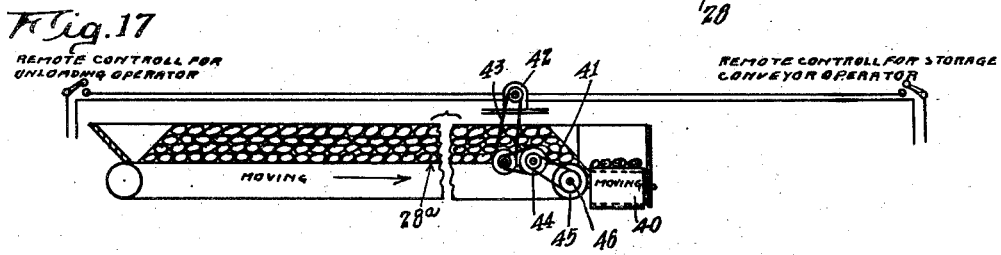
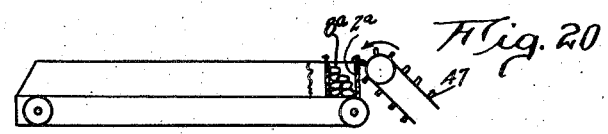
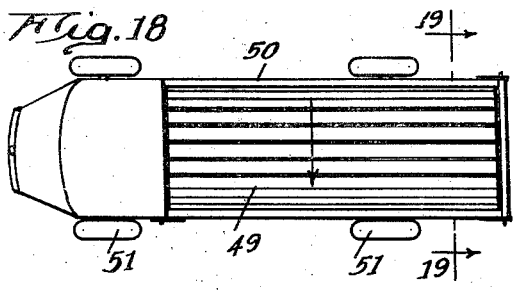
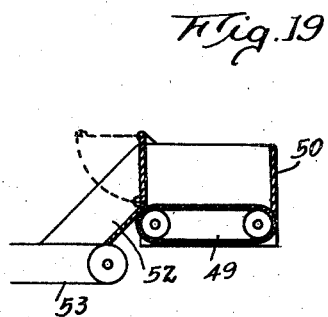
Inventor
Bernard J. Butler
By Lyon & Lyon
Attorneys Patented Sept. 3, 1946

2,406,992

UNITED STATES PATENT OFFICE 2,406,992

METHOD AND APPARATUS FOR LOADING AND STORING PINEAPPLES

Bernard J. Butler, San Francisco, Calif., assignor to Maui Pineapple Company, Ltd., Honolulu, Territory of Hawaii, a corporation of Hawaii Application February 7, 1944, Serial No. 521,372

6 Claims. (Cl. 214—44)

This invention relates to a method and apparatus for collecting objects and for transporting them and placing them into storage. While the invention is capable of application for handling objects of any kind to a delivery point, or into storage, it is particularly useful for handling objects that should not be roughly handled or dumped, nor be subjected to the relatively great pressures which would naturally occur at the lower levels in the mass of the objects if they were moved in loads of considerable depth.

In the present specification, the invention is disclosed as applied to the handling of pineapples from the field into storage, or directly into a cannery or processing plant.

Pineapples must be ripened on the plant and picked at full maturity. In this condition they are quite easily injured and must be handled carefully. On this account it has been the practice heretofore to gather the pineapples and place them in boxes in the field. The boxes are then loaded onto vehicles such as trucks, and transported from the field to the storage space at the cannery or processing plant where the boxes are again manually unloaded from the trucks. Handling the pineapples from the field by means of boxes, entails considerable hand labor, and is unsatisfactory for many reasons, among which is that the empty boxes must be distributed at various points in the field where they are to be filled, and it is difficult to estimate how many boxes will be required at particular locations. This difficulty necessitates frequent special trips of trucks to bring in additional boxes, or to remove boxes from places where more of them have been dropped than was necessary in that particular locality.

As the trucks transporting the boxes arrive from the fields, it has been the custom to manually unload them onto platforms at about the level of the truck bottom. From this platform the boxes are then handled on hand trucks into the storage space, or directly into the cannery.

The general object of this invention is to provide a simple method and apparatus for handling pineapples from the field into storage, which will avoid the necessity for employing boxes, and will obviate a very considerable amount of the hand labor that is now necessary.

Another object of the invention is to provide a simple method and apparatus for handling the pineapples enmasse or in bulk without, however, subjecting them to such injurious pressure as would be occasioned if they were carried in loads of considerable depth; also to provide a simple method and means for facilitating the loading of the fruit onto the bottoms of the vehicles that bring them in from the field, in such a way as to enable the vehicles to be loaded rapidly, but without permitting the fruit to fall upon the hard bottom of the vehicle; and to effect the loading of the vehicle so that its bottom can be covered quickly to a substantially uniform level, so that the depth of the load on the vehicle bottom is kept below a figure which will insure that none of the fruit will be injured from the pressure and weight of the mass of fruit above it.

Another object of the invention is to provide a simple method and apparatus for enabling a load of substantially uniform depth on the vehicle bottoms, to be transferred enmasse to the storage space without changing the depth of the load of fruit in its transfer to the storage space, and with the minimum amount of movement between the pineapples, relative to each other, as they are transferred from the vehicles to the storage area.

Further objects of the invention will appear hereinafter.

The invention consists in the novel method and in the apparatus to be described hereinafter, the features of which all contribute to produce an efficient method and apparatus for collecting, transporting, and handling objects into storage.

A preferred embodiment of the invention is described in the following specification, while the broad scope of the invention is pointed out in the appended claims.

In the drawings:

Fig. 1 is a diagrammatic view showing a vehicle in side elevation and partial section, and illustrating one of the first stages in the loading operation at the commencement of the loading of the pineapples into the vehicle.

Fig. 2 is a view illustrating the body of the vehicle in longitudinal section, and illustrating one of the last stages of the loading operation when the vehicle body is almost filled with the fruit.

Fig. 3 is a view similar to Fig. 2, but illustrating the vehicle body fully loaded.

Fig. 4 is a diagrammatic side elevation in partial section, illustrating one stage of the operation of effecting the transfer of the load en masse from the vehicle, onto the conveyor into the storage space. In this view certain parts are broken away, and others are shown in section.

Fig. 5 is a view similar to Fig. 4, but illustrating another stage in the operation of transferring the load from the vehicle onto the conveyor on the storage floor.

Fig. 6 is a view similar to Fig. 5, but illustrating the next stage in the operation of transferring the load from the vehicle to the storage conveyor.

Fig. 7 is a view similar to Fig. 6, and illustrating the next stage in the operation of transferring the load from the vehicle to the floor conveyor, for storage.

Fig. 8 is also a diagrammatic view illustrating another subsequent stage in the transferring operation of the load, in which the load is being moved mechanically off of the vehicle bottom, and the storage conveyor is being moved to carry the transferred portion of the load forwardly after receiving it from the vehicle.

Figs. 9, 10, and 11 illustrate successive stages in the unloading operation after the load has been completely moved off of the vehicle, and supported entirely on the storage conveyor. Fig. 11 illustrates diagramamtically how the vehicle moves away from the storage conveyor at the last stage in this operation.

Fig. 12, as compared with Fig. 4, is a diagrammatic view to illustrate the operation of transferring a load from a vehicle to a storage conveyor after the storage conveyor bears a load received from a prior truck. While Figs. 4 to 11, inclusive, illustrate the transfer of a load from the vehicle floor to an empty storage conveyor, Fig. 12 illustrates the first stage of transfer of a load when the storage confeyor already has a load upon it.

Fig. 13 is a view similar to Fig. 12, but illustrates the next stage in the operation of transferring a load from a vehicle bottom to a storage conveyor that is already carrying a load extending back to its point of connection to the vehicle bottom.

Fig. 14 is a view similar to Fig. 13, but indicating a further stage in the operation of transferring a load from the vehicle to the storage conveyor.

Fig. 15 is a view similar to Fig. 14, but illustrating the condition of a complete mass of fruit at a later stage in the operation of transferring the load from the vehicle to a storage conveyor that has already received a load. This view illustrates the normal operation of the method and apparatus, in which the depth of the load on the storrage conveyor is maintained substantially the same as the depth of the load on the vehicle bottom.

Fig. 16 is a view similar to Fig. 15, but illustrating a possible way of employing this method under the circumstances where there is such ample storage space as to enable the depth of the fruit on the storage conveyor to be reduced below that which existed in the vehicle that supplies the fruit to the storage conveyor.

Fig. 17 is a diagrammatic view of one of the storage conveyors, and illustrating how it can deliver fruit from it upon a carrier belt that takes the fruit from storage into the cannery or processing plant. This view illustrates the application of remote control for the storage conveyor, enabling it to be controlled from two points.

Fig. 18 is a plan illustrating the vehicle in which the delivery of the load is laterally, or from the side of the vehicle instead of from the rear end.

Fig. 19 is a vertical cross-section taken on the line 19—19 of Fig. 18, and illustrating diagrammatically the transversely moving bottom conveyor for a vehicle such as illustrated in Fig. 18.

Fig. 20 is a diagrammatic view illustrating the use of mechanical means for loading the fruit over the tail-board of the vehicle, which method may be employed instead of hand-loading by laborers loading the fruit directly by hand over the tail-board.

My method and apparatus are applicable in the loading of any objects into a vehicle for transportation, and then subsequent unloading into storage, but in the present specification I have described my invention as applied to the collection, transportation, and storage of fruit, for example, pineapples. In accomplishing this, I employ a wheeled vehicle or truck 1 (see Fig. 1) which is provided with a tail-gate 2, and which is also provided with a bottom conveyor 3 which is in the form of an endless belt construction comprising two chains such as the chain 4. In the present instance, these endless chains 4 are located at opposite sides of the body of the vehicle, this arrangement being adopted where the load is to be taken off of the vehicle from its rear end. However, this conveyor may be mounted so as to move transversely of the vehicle, as will be described hereinafter. This bottom conveyor includes a plurality of transverse slats 5 connected with the chains 4, and these slats are disposed quite closely together so as to avoid forming large gaps between them which would interfere with the proper functioning of the conveyor. It is only necessary that these slats 5 be provided for that portion of the conveyor that is uppermost when the truck is fully loaded.

The conveyor is provided with a confining wall or forward bulkhead or gate 6 that is attached to the run of the conveyor that is located within the vehicle. This confining wall extends completely across between the side walls of the vehicle, and is positioned at the forward or cab end of the slatted portion of the conveyor. It is carried forward by the conveyor whenever the conveyor is advanced in the direction of the arrow in Fig. 1, and rearward with the upper run of the conveyor 3 in unloading operations as shown in Figs. 6 and 7.

In starting the operation of loading the objects such as fruit into the vehicle 1, I commence by providing a relatively narrow initial receiving space 7 which results when the gate 6 is located a short distance forward of the tail-gate 2. (Fig. 1.) After establishing this relatively small initial receiving space 7, the conveyor 3 is held stationary while the laborers carrying the pineapples, bring them up in sacks and deposit the contents of the sacks gently into the receiving space 7, in a manner to prevent the fruit from being bruised by dropping on the bottom conveyor. In this way, the receiving space 7 will be filled with the pineapples, to a depth not too great, to produce an injurious pressure on the pineapples on the bottom. In practice, this depth is approximately two feet.

After the initial receiving space 7 is full, the conveyor 3 is then operated to advance the forward gate 6, thereby enlarging the receiving space 7. In doing this, of course the load on the conveyor moves forward with the gate, and the pineapples in this space will then settle down somewhat so that they will present an inclined upper surface 8, the angle of which depends upon the angle of repose of the objects being loaded. With pineapples, this angle is approximately 45°. After moving the gate forward in this way, more pineapples are loaded onto the depressed upper face of the load already in the vehicle, until the top of the load is brought up to the desired level, for example, two feet. If the loading by the laborers is accomplished rapidly, the conveyor and the attached forward gate 6 could be given a continuous forward movement, but if desired, the forward gate can be moved forward with a step-by-step movement, for example, six inches at a time or thereabout. By proceeding in this way, most of the load now in the vehicle, will have a horizontal upper surface substantially level with the upper edges of the side walls of the vehicle, that is to say, this level would be about two feet above the bottom conveyor. There would be at the rear end of the load, a loading space in the vicinity of the tail-gate 2, which the laborers would be continually filling up with additional pineapples.

In Fig. 2 I illustrate the last intermediate stage in the loading of the vehicle. In this view the gate 6 has moved forward as far as it can move, and the conveyor is now stationary. In this view a receiving space 7a is shown at the rear end of the vehicle where the load 11 in the vehicle has a rear toe with an inclined surface 8 disposed at about the angle of repose of the pineapples. This space 7a would of course then be filled with pineapples to form the complete load 11, as illustrated in Fig. 3.

If desired, in order to facilitate loading of the pineapples over the gate 2, I may provide a ramp 12 (shown in Fig. 1) mounted at the rear end of the vehicle, and the loaders can move up this ramp when they are depositing the fruit into the unfilled loading space adjacent the tail-gate.

The vehicle which I prefer to use has a power take-off from the truck motor located beneath the cab floor. This power take-off is operated and controlled as to speed and direction by the truck operator. From this power take-off 13 indicated by dotted lines in Fig. 1, a drive shaft 14 extends back to a drive mechanism 15 connected by a drive chain 16 to the rear drive shaft 17 of the conveyor. This drive shaft 17 bears the sprockets indicated by the circles 18 over which the chains of the conveyor run.

The forward end of the conveyor is carried on suitable sheaves or sprocket wheels 19 carried on a cross shaft 20.

Although the details of the truck form no part of my invention, it is desirable to employ some kind of an automatic alarm or control to prevent the head-gate or confining wall 6 from injuring any of the parts of the truck if the man operating the conveyor, carries its movement further than the proper limits of the travel of the wall 6. For this purpose, as illustrated in Fig. 2, I provide the upper edge of the moving gate 6 with a contact 21, which, at the forward limit of the movement of this head-gate, will strike another contact 22 so as to close an alarm circuit through wires 23 and 24. A similar contact 25 is provided at the rear end of the truck, connected with a wire 26 that will complete an alarm circuit also at that end.

These alarm circuits if desired, may be employed through appropriate relays to cut off the ignition and thus automatically stop the truck motor, or for any desired means for automatic control.

The operation of transferring the load from the truck to the storage bin or storage area, depends in detail upon whether a storage area is already loaded or not. In Fig. 4, and the immediate following figures, I illustrate the mode of operation of my method and apparatus if the storage area is empty when the truck arrives with a load. Referring to Fig. 4, this view illustrates the vehicle or truck parked in a position to enable the bottom conveyor 3 to transfer the load onto the upper run 27 of a floor conveyor 28, in the form of an endless belt with transverse slats close together, connected to side chains such as employed in the construction of the bottom conveyor of the truck. The upper run 27 of the storage conveyor 28 is disposed considerably below the level of the upper run of the truck bottom conveyor 3. In other words, it is preferably disposed at a distance below the truck bottom so as to enable gravity to be employed to assist in transferring a load from a truck onto a storage conveyor.

Each storage conveyor with its side walls 29, constitutes a bin or storage space in which the pineapples can be stored before conveying them into the cannery. In practice, of course, there would be a considerable number of these bins disposed alongside of each other, with catwalks between them for enabling an inspector to pass down between the bins. The entire storage space composed of these bins alongside of each other, may be covered by a suitable roof 30. At the receiving end of each storage conveyor 28 a movable gate 31 is provided, which is disposed in a substantially upright or vertical position as indicated in Fig. 4, when the load from the vehicle is ready to be transferred onto an empty storage conveyor.

At the step in the unloading operation indicated in Fig. 4, with the vehicle positioned ready to deliver its load to the empty conveyor 27—28, both the truck conveyor 3 and the storage conveyor 27—28 are at rest. The tail-gate 2, which is pivoted at 2a, is then pulled up to an elevated position as indicated in Fig. 5, by means of a rotatable shaft 32 rotatable by means of a crank 32a which wraps up upon it a cord 33 (see Fig. 4) that is attached to gate 2 near its lower edge. When this gate is pulled up in this manner, a portion of the load at the rear end of the vehicle, will settle down or roll down toward the conveyor 28. In accordance with my method, I guide this rear portion of the load downwardly in an inclined path toward the floor conveyor 28, and for this purpose I provide an inclined chute 34 having side walls 35 that are put in place to retain the fruit at each side, in line with the side walls of the vehicle. It may be that some of the fruit will become slightly injured in rolling down this chute, but this would be a very small proportion of the load being transferred, and if the gate 2 is raised slowly, the amount of injury to this fruit could be reduced to a minimum.

When the tail-gate 2 is being raised in this way, both the conveyors are held stationary, but after the gate 2 has been raised, and the load taken the position indicated in Fig. 5, the bottom conveyor 3 of the vehicle is then started and advanced slowly to move the entire truck load rearward toward the receiving gate 31 for a short distance. This movement of the truck conveyor with a stationary conveyor, will tend to fill the chute 34 with pineapples distributed substantially as shown in Fig. 6.

After the chute 34 has been filled in this way, and the truck conveyor stopped, the receiving gate 31 is swung up on its hinge 31a to an elevated position such as illustrated in Fig. 7. This may be accomplished if desired, in the same manner as the raising of the tail-gate 2, that is to say, by means of a cord 36 attached to the lower edge of the gate, and which wraps around a shaft or arbor 37 rotatable by means of a crank 38. When this receiving gate 31 is thus raised, the fruit in the chute will settle down slowly and distribute itself substantially in the manner illustrated in Fig. 7. The fruit in the chute will present an inclined upper surface 39 disposed at approximately the angle of repose of the fruit, that is to say, about 45° as shown.

The next step or stage of the operation of transferring a load, is illustrated in Fig. 8, which figure indicates this next stage after it has progressed somewhat. This stage involves the simultaneous starting of both conveyors, and driving them at substantially the same linear speed. As the forward end of the load of fruit carried on the receiving end of the storage conveyor moves forward, the fruit in the chute passes down en masse and with very slight relative movement of the pineapples with respect to each other, because they are constantly supported from below. Fig. 8 illustrates the truck 1 about half unloaded. As this movement progresses, eventually all of the load will be moved off of the truck, and the condition such as illustrated in Fig. 9, will be reached, at which time the truck conveyor will be stopped either manually or by means of some automatic control actuated by rear contacts of circuit 25—26.

The storage conveyor 28 will, however, continue to be advanced a short distance so as to move the load upon it sufficiently forward to level off its entire upper surface, at which time the conveyor 28 will be stopped. At this stage of the operation the outer end of the load is supported on the bottom of the chute 34, as is indicated in Fig. 10. The truck or vehicle can thereafter be pulled away, both truck and storage conveyor being then at rest as indicated in Fig. 11.

Figs. 12 to 16 illustrate the successive steps of transfering a load from a truck onto the storage conveyor when the storage conveyor has already previously received a partial load. In conducting these operations, the vehicle is parked so that the delivery end of its bottom conveyor is in position to deliver its load onto the receiving end of the stationary storage conveyor, as shown in Fig. 13. In all of these operations the receiving gate 31 is shown held up out of the way since it is only employed in delivering the first load onto an empty storage conveyor.

Fig. 13 illustrates the first step in effecting the transfer of the load after the truck has been parked in position. This step consists in raising the end truck gate 2, whereupon the rear end of the load on the truck will settle down into the chute 34. The truck conveyor is then started and continued in operation until the condition illustrated in Fig. 14 is reached, after which time the storage conveyor is also put into motion. The situation with both conveyors moving and with the truck partially unloaded, is illustrated in Fig. 15, which is similar to Fig. 8. The sequence of operations thereafter as the truck becomes fully unloaded, is the same as for that employed for the preceding trucks, as illustrated in Figs. 9 and 10.

Whenever in these operations the two conveyors are driven at substantially the same linear velocity, they will move the truck load bodily toward the storage conveyor, which at the same time, will carry its load forward to make space for the new load coming off of the truck. In practice, the storage conveyors may be quite long, so as to accommodate a considerable number of truck loads, which loads will be located end to end on the storage conveyor. Fig. 15 illustrates a late stage of this operation in which the major portion of a truck load has been transferred to the storage conveyor.

While it would usually be the practice to transfer the load from the vehicle to the storage conveyor so that the depth of the load on the storage conveyor would be substantially the same as that upon the truck which, in the case of pineapples, is preferably about two feet, in some cases, if there be ample storage space available, it might be desired to place the pineapples in storage at a somewhat less depth on the storage conveyors. This can readily be accomplished by driving the storage conveyor at a slightly greater speed than the linear speed of the truck conveyor in transferring the load, as is illustrated in Fig. 16.

In order to facilitate handling of the pineapples into the cannery or into a processing plant, I prefer to provide a transverse conveyor 40 (see Fig. 17). This conveyor is preferably in the form of a movable belt that can be driven whenever desired, and all of the bins or storage conveyors head up to the side of this cross conveyor. Any of the storage conveyors such as the storage conveyor 28a illustrated in Fig. 17, can deliver any desired quantity of pineapples from the forward toe 41 of their load, by driving the storage conveyor at appropriate speeds. This may be accomplished by an electric motor 42, which is connected by a belt or chain 43 to a reduction drive mechanism 44, including belts or chains as indicated diagrammatically, which operate a pulley or sprocket 45 on the shaft 46 that carries the sprockets at the end of the storage conveyors. The motor 42 may be operated when desired, by remote control located at any preferred position in the plant, such as the delivery end of the belt 40.

In Fig. 20 I illustrate diagrammatically the use of an inclined endless conveyor 47 that may be employed if desired, to deliver the pineapples over the tail-gate 2a of the truck, as illustrated, into the initial receiving space 8a. This inclined conveyor 47 would operate as a labor-saving device, as it enables the laborer simply to deposit the pineapples in a position to be picked up by this belt, and does not necessitate his walking up a ramp such as the ramp 12, illustrated in Fig. 1, when loading fruit into the vehicle.

Although the illustrations in Figs. 1 to 16 involve the use of a bottom conveyor in a vehicle that moves longitudinally of the vehicle, it should be understood that the practice of my invention does not necessitate using this direction of movement for the bottom conveyor of the vehicles. Under some circumstances, where it is convenient to have the storage conveyors of a width to correspond with the length of the truck, instead of the width, I may employ a transversely moving bottom conveyor 49 such as illustrated in Figs. 18 and 19. In such a case of course, the vehicle body 50 should be located high enough above the wheels 51 of the vehicle, to enable a side chute 52 to clear the wheels. The pineapples, of course, would descend in this chute down onto a storage conveyor 53.

Many other embodiments of the invention may be resorted to without departing from the spirit of the invention.

What I claim is:

1. The method of loading easily bruisable objects, such as pineapples, gently one upon another into the lading carrying space of a vehicle defined in part by having relatively movable front and rear walls, which consists in first positioning said front and rear walls comparatively close to each other to provide an initial relatively small receiving compartment open at the top for loading the objects from above into the said initial receiving compartment, separating said walls longitudinally of the vehicle to enlarge said compartment and thereby enabling the load to settle down so as to present a depressed upper surface on which other objects may be subsequently deposited, and loading additional ones of said objects from above onto the depressed surface of the load already in the enlarged receiving compartment up to a level substantially uniform transversely of the lading receiving space of the vehicle.

2. The method of loading easily bruisable objects, such as pineapples, gently one upon another to a substantially uniform depth into a vehicle having a tail gate, a movable bottom conveyer and a confining forward wall for the load attached to the conveyer, which consists in starting the loading with said confining wall located relatively near the tail gate to form a restricted initial receiving compartment open at the top, loading said objects from above into the initial receiving compartment to a desired level, driving the conveyer to advance said confining wall to enlarge the initial receiving compartment and enable the load to settle downwardly and present a depressed upper surface inclining toward said gate, and loading additional ones of said objects from above onto the depressed surface of the load already in the enlarged receiving compartment to raise the level of the load to the desired height.

3. The method of loading easily bruisable objects, such as pineapples, gently one upon another to a substantially uniform depth into the lading carrying space of a vehicle having front and rear walls and a movable bottom conveyer attached to one of said walls, which consists in first positioning said front and rear wall comparatively close to each other to provide a relatively small receiving compartment open at the top and bounded in part by said walls, loading the objects from above into the initial receiving compartment to a desired level, successively enlarging said receiving compartment longitudinally of the vehicle and thereby enabling the load to settle down upon each enlargement of said compartment to present a depressed upper surface, and loading additional ones of said objects from above onto the depressed upper surface of the load already in said compartment to fill the vehicle up to the desired level substantially uniformly throughout the area of the vehicle bottom.

4. The method of loading easily bruisable objects, such as pineapples, gently one upon another into the open lading carrying body of a truck having relatively movable front and rear walls one of which is a tail gate and a movable bottom conveyer attached to one of said walls, which consists in first moving one of said walls toward the other wall to form a comparatively small initial lading receiving compartment open at the top, loading the objects from above into said comparatively small receiving compartment to the desired level, successively moving the movable bottom conveyer for increasing the distance between said walls to enlarge the lading receiving compartment and thereby enable the load in the body to settle down upon each enlargement of said compartment so as to present a depressed upper surface, and loading additional ones of said objects from above onto the depressed upper surface of the load already in said compartment to fill the body of the truck substantially uniformly to the desired level.

5. A method of handling fruit from a vehicle having a bottom conveyor, onto a storage area having a floor conveyor; which consists in placing the discharge end of the truck conveyor in position to deliver to the floor conveyor, and at a higher level than the floor conveyor; placing a substantially upright confining wall at the receiving end of the floor conveyor; releasing the fruit on the vehicle and guiding the same so that it descends by gravity in an inclined path until the same is arrested at the said confining wall to establish a stream of closely packed fruit leading from the delivery end of the bottom conveyor to the receiving end of the floor conveyor; then withdrawing the confining wall to permit the fruit to settle by gravity onto the receiving end of the floor conveyor, and then driving both conveyors in a direction to transfer the fruit en masse from the vehicle to the storage conveyor.

6. In apparatus for handling a load of objects en masse, the combination of a vehicle having a bottom conveyor and a gate carried by the conveyor so as to advance therewith, and a relatively fixed tail-gate at the delivery end of the conveyor cooperating with the first gate to retain a load on the conveyor, a storage conveyor at a lower level than the bottom conveyor, a guide chute with an inclined bottom for guiding the objects onto the receiving end of the storage conveyor, a removable receiving gate at the lower end of the chute, capable of retaining a portion of the load from the vehicle when the same is pushed into the chute by the bottom conveyor, means for removing the receiving gate from the lower end of the chute, and means for effecting the driving of both the conveyors, enabling the same to be driven at controlled linear speeds to transfer the load through the chute from the bottom conveyor to the storage conveyor so that the load on the storage conveyor is delivered and maintained at a substantially uniform depth.

BERNARD J. BUTLER.